(12) United States Patent
White

(10) Patent No.: US 11,258,240 B1
(45) Date of Patent: Feb. 22, 2022

(54) CABLE GUIDES FOR USE WITH CABLE TRAYS

(71) Applicant: James C. White Company, Inc., Greenville, SC (US)

(72) Inventor: Thomas C. White, Greenville, SC (US)

(73) Assignee: James C. White Company, Inc., Greenville, SC (US)

(*) Notice: Subject to any disclaimer, the term of this patent is extended or adjusted under 35 U.S.C. 154(b) by 0 days.

(21) Appl. No.: 16/508,829

(22) Filed: Jul. 11, 2019

(51) Int. Cl.
*H02G 3/04* (2006.01)

(52) U.S. Cl.
CPC ......... *H02G 3/0456* (2013.01); *H02G 3/0437* (2013.01)

(58) Field of Classification Search
CPC .... H02G 3/0437; H02G 3/045; H02G 3/0456; F16L 3/221; F16L 3/223; F16L 3/26
USPC .................................................. 385/136, 137
See application file for complete search history.

(56) References Cited

U.S. PATENT DOCUMENTS

| | | | | |
|---|---|---|---|---|
| 2,087,640 | A | * | 7/1937 | Du Prey .............. H02G 3/0437 174/101 |
| 3,249,337 | A | | 5/1966 | Neumann |
| 3,637,175 | A | | 1/1972 | McElroy |
| D329,588 | S | * | 9/1992 | Michel, Jr. ............... H04Q 1/06 D8/395 |
| 5,203,526 | A | | 4/1993 | Green et al. |
| 5,640,482 | A | * | 6/1997 | Barry .................. G02B 6/4452 385/134 |
| 5,715,348 | A | * | 2/1998 | Falkenberg .......... G02B 6/4452 385/135 |
| 5,765,698 | A | * | 6/1998 | Bullivant ............. H01R 9/2416 211/26 |
| 5,809,733 | A | | 9/1998 | Venegas, Jr. |
| 5,816,542 | A | | 10/1998 | Rinderer |
| 5,921,402 | A | * | 7/1999 | Magenheimer .......... H02G 3/26 211/26 |
| 6,076,315 | A | | 6/2000 | Kondo |
| 6,102,214 | A | * | 8/2000 | Mendoza ................. H04Q 1/09 211/26 |
| 6,109,561 | A | | 8/2000 | Haines |

(Continued)

FOREIGN PATENT DOCUMENTS

| | | | | |
|---|---|---|---|---|
| CN | 107732814 A | | 2/2018 | |
| EP | 1320160 A1 | * | 6/2003 | ............. H02G 3/045 |

(Continued)

*Primary Examiner* — Jonathan Liu
*Assistant Examiner* — Guang H Guan
(74) *Attorney, Agent, or Firm* — Nexsen Pruet, PLLC; Seth L. Hudson

(57) ABSTRACT

A cable guide is dimensioned to fit as an insert inside a cable tray. It has a bottom, two sides and a top. The top is made of interleaving, resilient flanges that are spaced apart to define a serpentine path that is wide enough to enable the user to fit a cable into the interior of the cable guide and to remove the cable through the interleaved flanges without disturbing the positional integrity of other cables in the cable tray. The cable guide may be fastened to the cable tray using one or two bolts and may be fastened so that it is spaced apart from the wall of the cable tray. Two cable guides may be installed side-by-side and several can be installed at spaced intervals along a cable tray and throughout a system.

20 Claims, 11 Drawing Sheets

(56) References Cited

U.S. PATENT DOCUMENTS

| | | | |
|---|---|---|---|
| 6,140,584 A * | 10/2000 | Baldissara | H02G 3/045 |
| | | | 174/68.3 |
| 6,539,161 B2 * | 3/2003 | Holman | G02B 6/4452 |
| | | | 385/136 |
| 6,547,192 B2 | 4/2003 | Rinderer et al. | |
| 6,567,602 B2 * | 5/2003 | Cole | G02B 6/4459 |
| | | | 385/136 |
| 6,708,918 B2 | 3/2004 | Ferris et al. | |
| 6,729,606 B1 | 5/2004 | Durin | |
| 6,768,858 B2 * | 7/2004 | Tinucci | G02B 6/4471 |
| | | | 385/134 |
| 6,856,505 B1 * | 2/2005 | Venegas | G06F 1/1601 |
| | | | 361/679.05 |
| 7,130,521 B2 | 10/2006 | McCrary et al. | |
| 7,258,583 B1 * | 8/2007 | Baiza | H02G 3/0431 |
| | | | 174/72 A |
| 7,621,487 B2 | 11/2009 | Brown et al. | |
| 7,760,983 B2 | 7/2010 | Jadaud | |
| 7,770,344 B2 | 8/2010 | Betz | |
| 7,826,707 B2 | 11/2010 | Cassidy et al. | |
| 8,331,752 B2 * | 12/2012 | Biribuze | G02B 6/4452 |
| | | | 385/135 |
| 8,464,984 B2 * | 6/2013 | Laursen | H02G 3/30 |
| | | | 248/68.1 |
| 8,573,409 B2 | 11/2013 | White | |
| 8,628,157 B2 * | 1/2014 | Burek | H04Q 1/06 |
| | | | 312/223.6 |
| 8,958,681 B2 | 2/2015 | Ripplinger | |
| 9,071,041 B2 * | 6/2015 | Sayres | H02G 3/32 |
| 9,556,976 B1 | 1/2017 | Thompson et al. | |
| 10,243,334 B1 | 3/2019 | Krietzman | |
| 10,271,452 B2 | 4/2019 | Henrich et al. | |
| 2003/0086673 A1 * | 5/2003 | Zah | G02B 6/4471 |
| | | | 385/136 |
| 2006/0039667 A1 | 2/2006 | McCrary et al. | |
| 2007/0164174 A1 | 7/2007 | Hung et al. | |
| 2009/0260846 A1 | 10/2009 | Henry | |
| 2015/0353319 A1 | 12/2015 | Henderson et al. | |

FOREIGN PATENT DOCUMENTS

| | | |
|---|---|---|
| ES | 2616463 | 6/2017 |
| GB | 2519963 A | 5/2015 |

\* cited by examiner

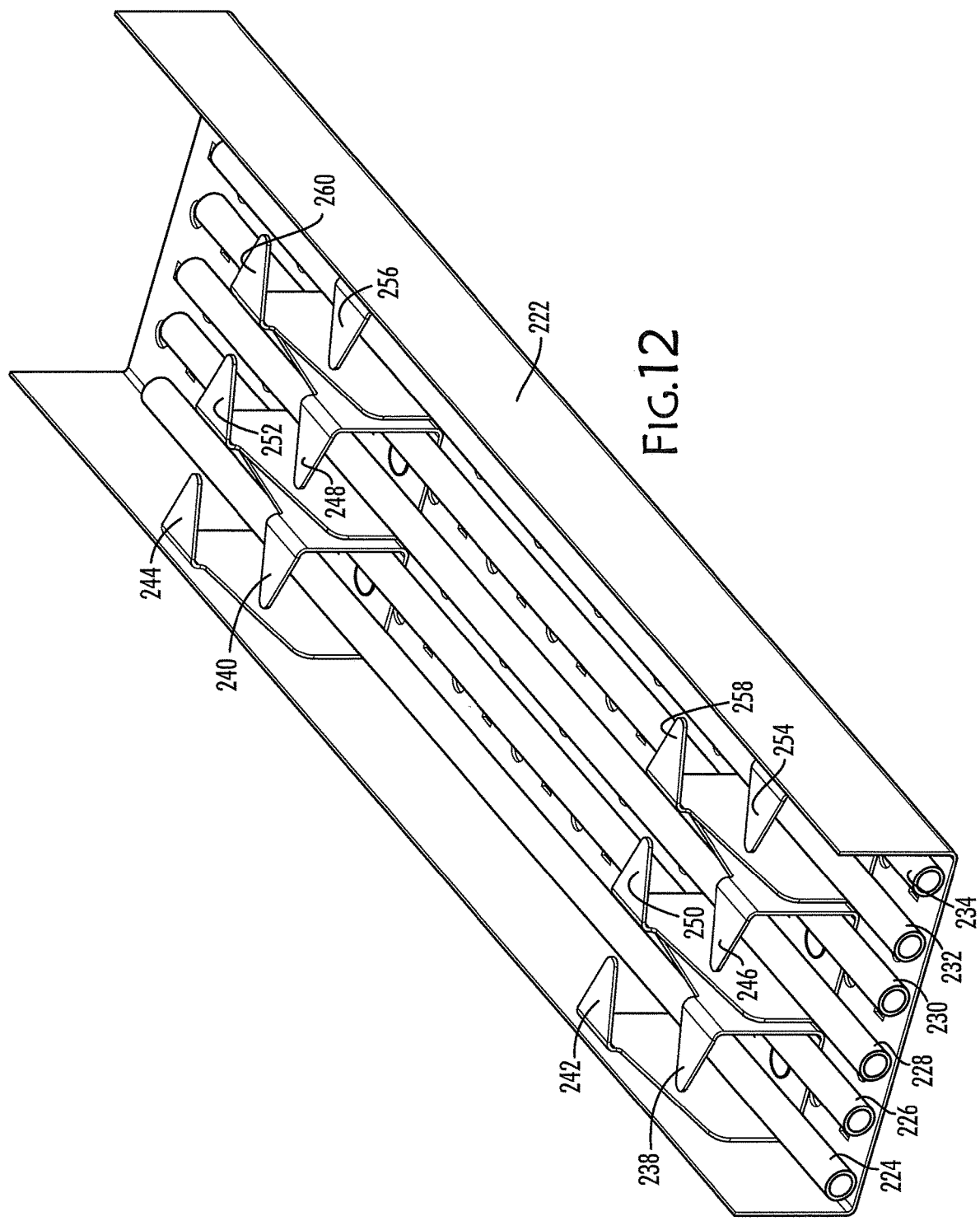

CABLE GUIDES FOR USE WITH CABLE TRAYS

FIELD

This disclosure relates generally to cables and flexible tubes in cable trays and, in particular, to cable guides for holding cables and tubes in cable trays.

BACKGROUND

In manufacturing plants, for example, computer cables, optic fiber cables, buss cables, ethernet cables, data transmission cables, and other cables RUN from one part of a manufacturing plant to another. Cables are often elevated with respect to the plant floor so vehicles and workers moving across the plant floor are unimpeded, and the cables remain safely out of the way. The elevated cables are nonetheless accessible for replacement, rerouting, modification and maintenance. Cable trays are used to hold cables and tubes above the plant floor and to organize cables by their destinations so that they can be traced easily and maintained efficiently.

Cable maintenance may include adding new cables, removing cables that are no longer used, and replacing defective cables. Cable guides may be used to hold cables and tubes in place in the cable tray. A cable guide that makes it easier to add and remove cables and tubes from cable trays and also holds them securely, efficiently and properly in position, would be an advantage.

SUMMARY

Briefly, and according to its major aspects, the present cable guide is a device for use with a cable tray and which facilitates the addition and removal of cables with respect to the cable tray and helps to hold cables in place in the cable tray. The cable guide includes a pair of opposing top surfaces or flanges extending partway across the opening of a cable tray. A first flange partially encloses the top opening of the cable tray from one sidewall of the cable tray toward the other sidewall, leaving space between the end of the flange and the opposing sidewall of the cable guide to provide access to the interior of the tray when adding a cable to, or removing a cable from, the tray. The diameter of the cable is able to pass between the end of the flange and the opposing sidewall. The second of the two opposing flanges, which is spaced axially apart from the first flange leaving a curved path for the insertion of the cable between the two flanges, extends from the second sidewall back across the tray toward the first sidewall, thereby partially enclosing the top opening with respect to the first cable guide to prevent a cable from falling out of the tray. The first flange and the second flange cooperate to define a curved path into the interior of the cable tray for a cable and simultaneously present an obstacle that tends to keep cables in place in the cable tray.

The cable guide may be made as one piece, with two opposing, spaced apart flanges, or as two separate pieces that are used as a pair, with one flange, to be spaced and otherwise positioned with respect to the other by a distance suitable for the stiffness and thickness of the particular cable being added or removed, that is, a little farther apart for a larger or stiffer cable and a little closer for a thinner or more flexible cable. Moreover, the separation between two adjacent cable guides depends on the flexibility of the flanges and the cable. The length of a cable guide flange depends on the width of the cable tray and the diameter of the cable that is to be inserted between the end of the guide flange and the opposing wall.

Whether as a pair of single cable guides or as a double cable guides, cable guides may be fastened to the cable tray—either to the interior of the cable tray or to the exterior of the cable tray—using fasteners.

BRIEF DESCRIPTION OF THE DRAWINGS

In the figures,

FIG. 12 is a wider cable tray with 12 single cable guides, the single cable guides arranged in two groups of three pairs of two opposing cable guides, according to an aspect of the disclosure.

DETAILED DESCRIPTION

In this description, for convenience and for simplifying the description of the disclosure, the term cable will be used to mean cables and flexible tubes, unless otherwise stated. The term cable tray will be used to include cable trays and tube trays or tube tracks. The term "cable guide" will be used to refer to "cable guide," "double cable guide" and "tube guide."

Figure 1:
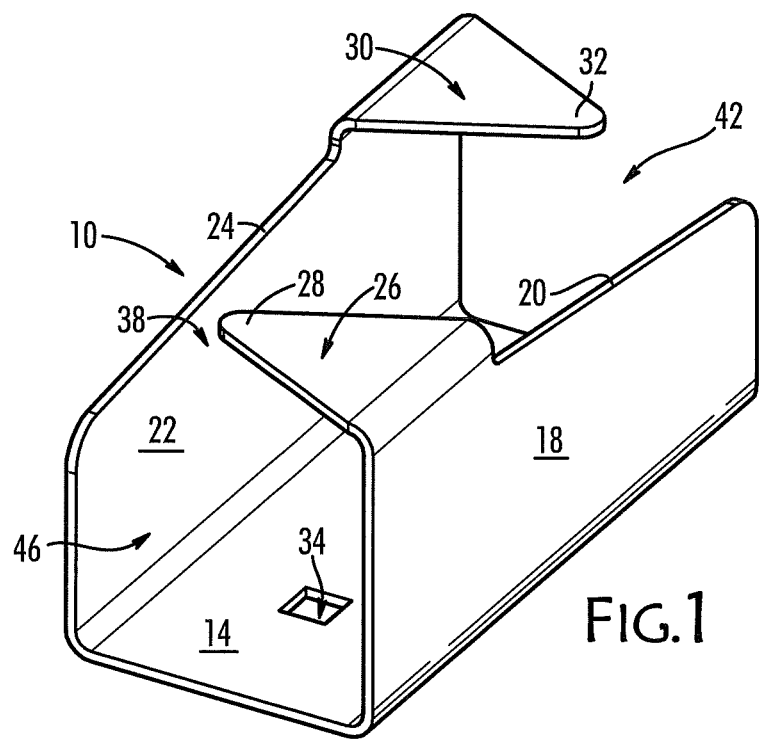
FIG. 1 is a perspective view of a double cable guide, according to an aspect of the disclosure.
Figure 2:
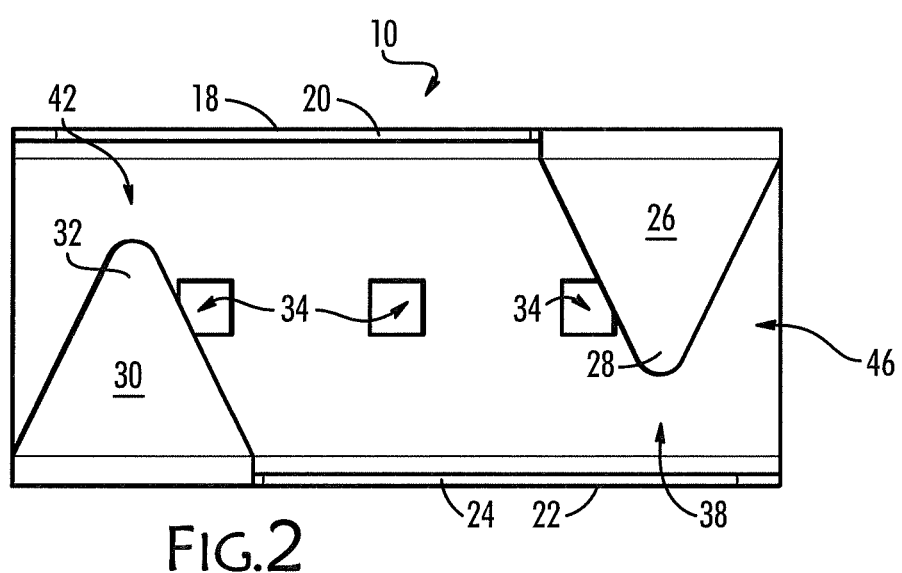
FIG. 2 is a top view of the double cable guide of FIG. 1, according to an aspect of the disclosure.

Referring now to the drawings, FIGS. 1 and 2 show a perspective view and top view, respectively, of a double cable guide 10. Double cable guide 10 includes a base 14, a first wall 18, and a second wall 22 spaced apart from first wall 18. Double cable guide 10 also includes a first flange 26 attached to and cantilevered from first wall 18 and a second flange 30 attached to and cantilevered from second wall 22. First flange 26 interleaves with second flange 30.

Base 14 of double cable guide 10 may have a hole 34 formed in it, as best seen in FIG. 2. Hole 34 may be a square hole (as shown), a round hole, a slot, or other shape.

Figure 3:
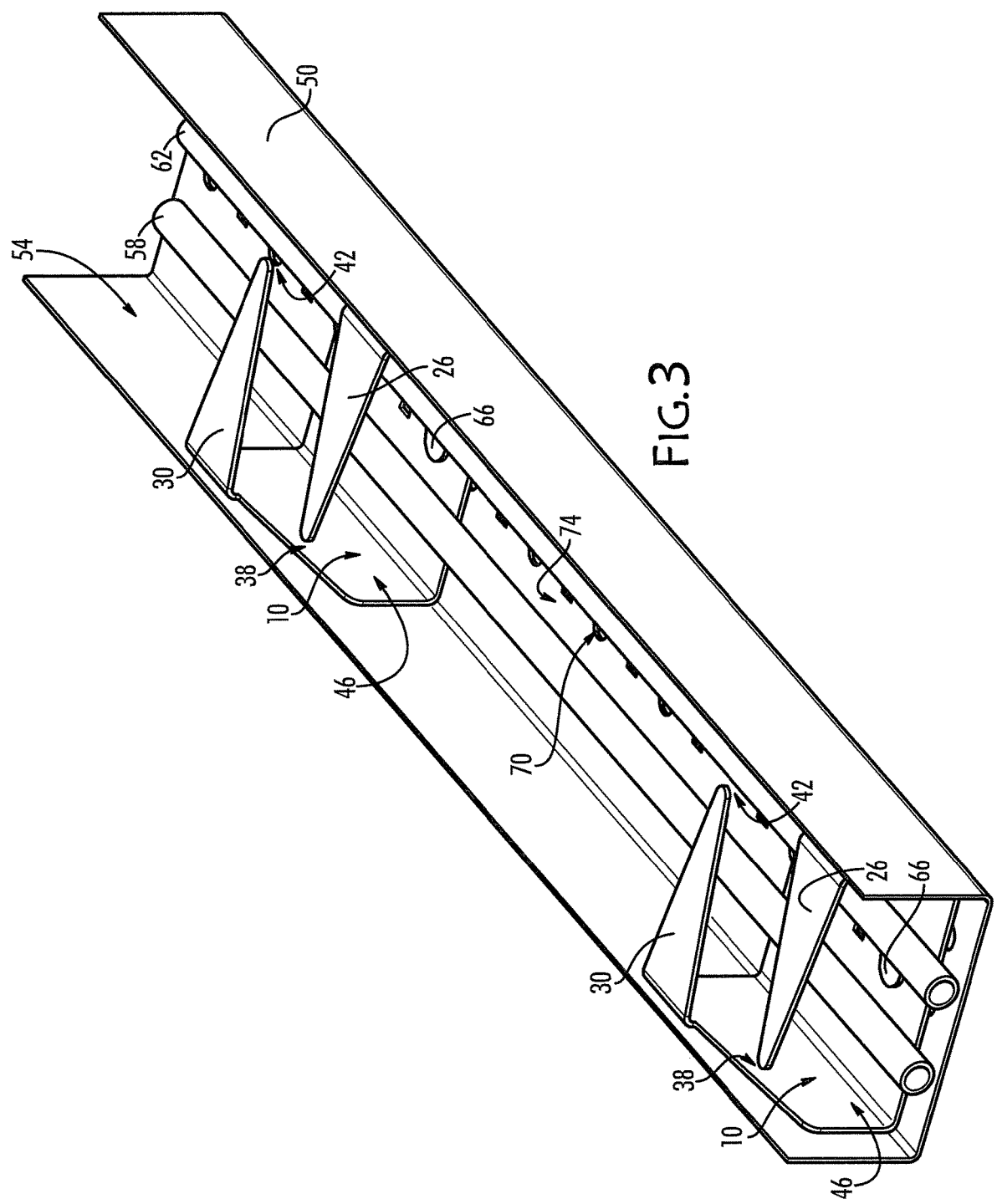
FIG. 3 is a perspective view of a cable tray with two double cable guides that are holding two cables, according to an aspect of the disclosure.

First wall 18 and second wall 22 of double cable guide 10 may be parallel to the other and perpendicular to base 14. First wall 18 and second wall 22 may be the height of a cable tray 50 (as best seen in FIG. 3) so that a cable tray cover (not shown) can be used to cover cable tray 50 when holding double cable guides 10 without interference.

First wall 18 and second wall 22 of double cable guide 10 have top edge 20 and top edge 24, respectively. First wall 18 and second wall 22 may be tapered, that is, first wall 18 and second wall 22 may be higher above base 14 starting at first flange 26 and second flange 30, respectively, and tapered to be gradually lower above base 14 farther from first flange 26 and second flange 30, for reasons that will be explained presently.

First flange 26 and second flange 30 extend generally parallel over base 14 in opposing directions, with first flange 26 extending horizontally toward second wall 22 and second flange 30 extending horizontally toward first wall 18, respectively, neither extending to touch the opposing wall. A first gap 38 remains between first flange 26 and second wall 22, and a second gap 42 remains between second flange 30 and first wall 18. First gap 38 and second gap 42 are made wide enough to pass a cable (not shown) having a diameter approximately the size of first gap 38 and second gap 42.

That first gap 38 and second gap 42 are on opposing sides of cable guide 10 is a feature of the disclosure. First flange 26 helps to guide a cable toward first gap 38, and second flange 30 helps to guide a cable toward second gap 42, and first flange 26 and second flange 30 help to keep a cable within a cable guide once the cable passes through first gap 38 and second gap 42, and is in place, as described more fully below. Cable clamps or other temporary cable installation devices are not used with single or double cable guides formed according to the present disclosure.

Note that the taper of first wall 18 and second wall 22, as noted above, results in a first gap 38 and second gap 42 that are slightly larger than that obtained had first wall 18 and second wall 22 not been tapered. The reason first gap 38 and second gap 42 are slightly larger is because they are the hypotenuses of two right triangles. First gap 38 and second gap 42 provide slightly more room for a cable to be inserted when inserted on a slight angle from vertical between first flange 26 and second wall 22, and between second flange 30 and first wall 18.

First flange 26 and second flange 30 are integrally formed with first wall 18 and second wall 22, respectively, and they define tapered horizontal cantilevers extending from first wall 18 and second wall 22, respectively. An end 28 of first flange 26 and an end 32 of second flange 30 may also be curved ends. The contoured, tapered sides and curved edges and ends of first flange 26 and second flange 30 reduce friction and avoid damage to cables as they are being installed into double cable guide 10. First flange 26 and second flange 30 also provide approach angles from either side to urge cables to slide into cable guide and toward first gap 38 and second gap 42, respectively, of double cable guide 10 and also enable the distance between first flange 26 and second flange 30 to be smaller by their facilitation of the maneuvering of a cable around first flange 26 and second flange 30 and into cable tray 50 (see FIG. 3).

Double cable guide 10 may be made of metal, metal alloy, structural plastic, or composite, and may be resilient so that first flange 26 and second flange 30 are able to bend up or down in accommodating a cable passing into interior 46 of double cable guide 10 through first gap 38 or second gap 42. When first flange 26 and second flange 30 flex, they bend resiliently to facilitate that insertion. Moreover, the tapering of the edges of first flange 26 and second flange 30 reduce the extent of the deflection of ends 28, 32, of first flange 26 and second flange 30, respectively, for the cable to pass into or out of cable guide 10.

FIG. 3 shows a cable tray 50 having an interior 54 into which two identical double cable guides 10 have been inserted. The same reference numbers used in FIG. 1 for double cable guide 10 are used for double cable guides 10 shown in FIG. 3. Double cable guides 10 are shown spaced apart. Two cables 58, 62 are shown in the interior 54 of cable tray 50 and in the interiors 46 of double cable guides 10. Double cable guides 10 span the width of interior 54 of cable tray 50. First flange 26 and second flange 30 of double cable guide 10 leave first gap 38 and second gap 42 that will enable insertion or removal of at least one of cables 58, 62, and for insertion of additional cables without disturbing the integrity of the respective positions of cables 58, 62.

Cable 58, for example, is guided into interior 54 through first gap 38 so it passes around and under first flange 26 while cable 58 is still above second flange 30, and then cable 58 can pass around second flange 30 into second gap 42 and under second flange 30 into interior 46 of double cable guide 10.

Double cable guides 10 shown in FIG. 3 are secured to cable tray 50 using fasteners, such as low-head fasteners 66 through holes 70 in a floor 74 of cable tray 50. Other fasteners and securing means may be used, such as machine bolts with nuts, carriage bolts with nuts, rivets, snap-in pins, adhesives, and weldments.

Figure 4:
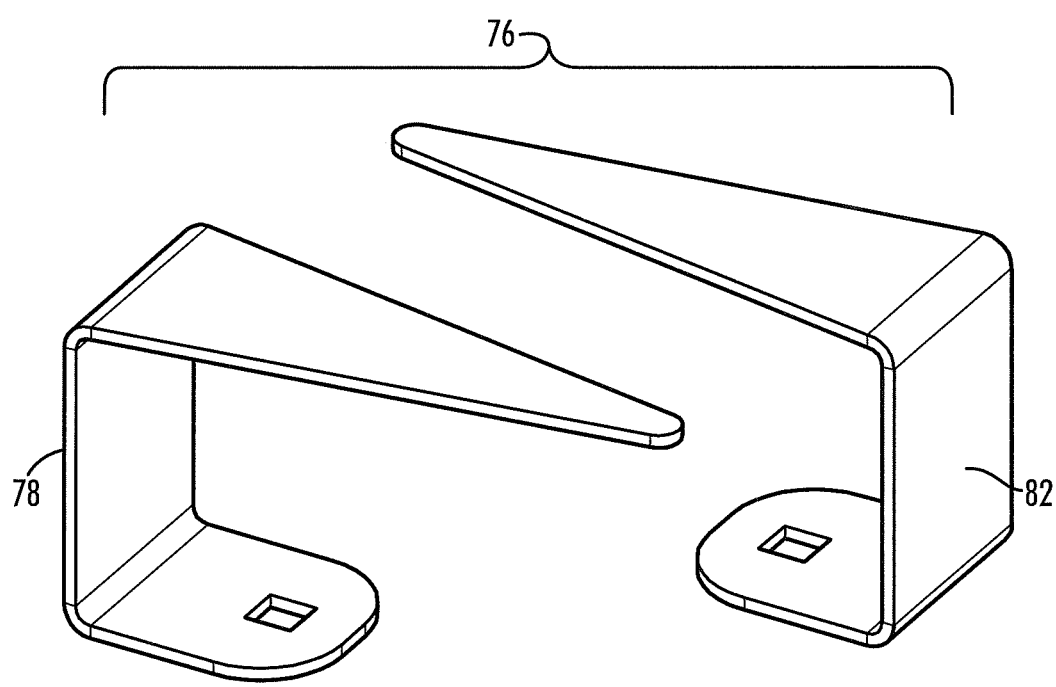
FIG. 4 is a perspective view of two single cable guides, according to an aspect of the disclosure.
Figure 5:
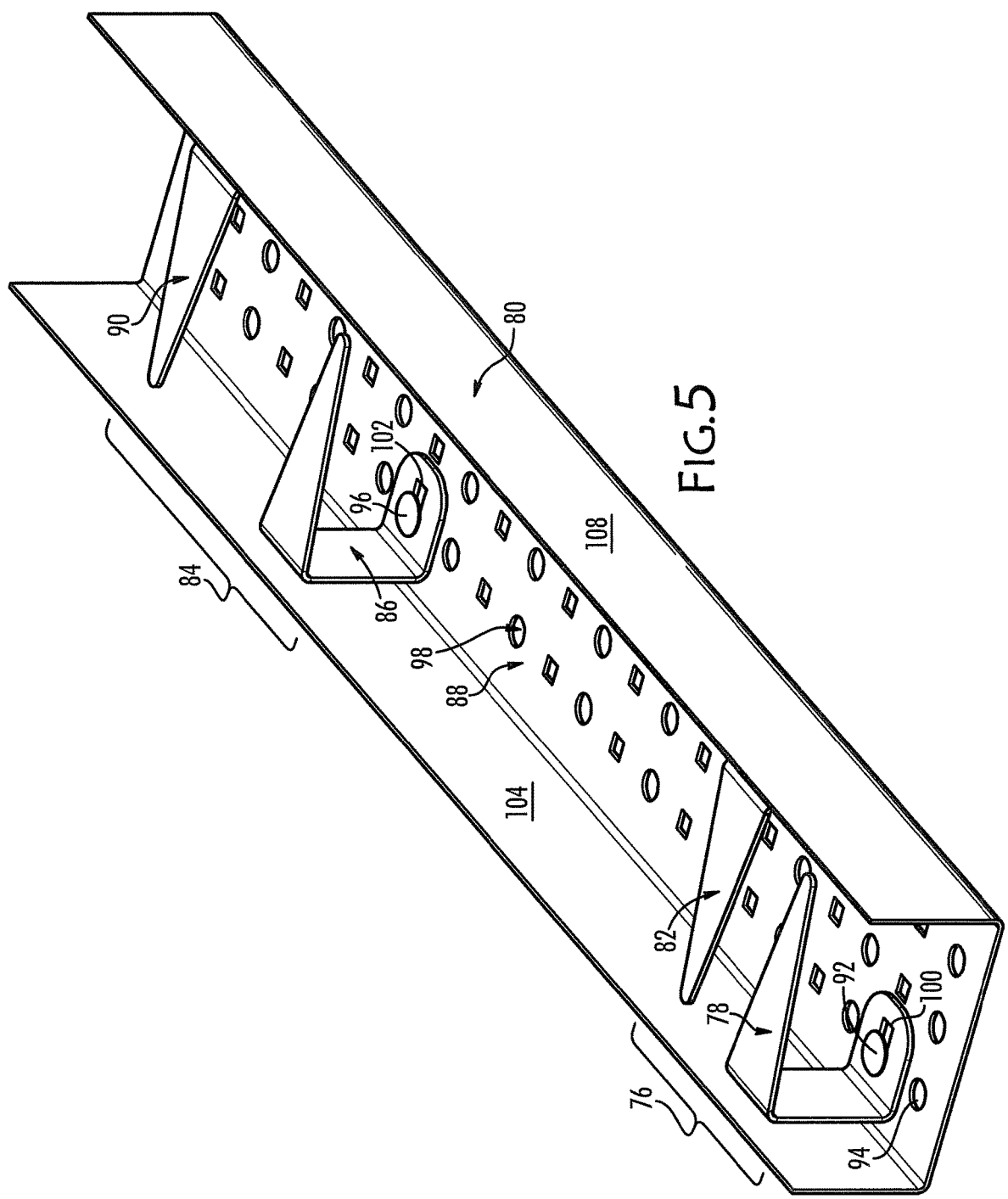
FIG. 5 is a perspective view of a cable tray with two pairs of single cable guides used with a cable tray, according to an aspect of the disclosure.

FIG. 4 illustrates a first pair 76 of single cable guides 78, 82, in perspective, and FIG. 5 illustrates first pair 76 of single cable guides 78, 82, and a second pair 84 of single cable guides, 86, 90, in a cable tray 80. Cable tray 80 has a floor 88. Single cable guides 78, 82, may also be made of metal or structural plastics.

Single cable guides 78, 82, of first pair 76 have a different spacing than that of single cable guides 86, 90 of second pair 84, which illustrates an advantage of single cable guides 78, 82, compared to double cable guide 10, namely, flexibility in spacing single cable guide 78, 82. A disadvantage of single cable guides 78, 82, compared to double cable guides 10 is the need to fasten single cable guide 78, 82, to floor 88 individually rather than to use one fastener to secure one double cable guide 10 to floor 74 (as shown in FIG. 3 and FIG. 5), which slows installation. Single cable guides of first pair 76 in FIG. 4 have an advantage when regulating cable tray curves and fittings that intersect with other cable trays.

Single cable guides 78, 82, may be attached to cable tray 80 using fasteners such as bolts 92, 96, inserted into holes 94, 98, in floor 88 of cable tray 80 for single cable guides 78, 82, and then tightening bolts 92, 96. Single cable guides 78, 82, may have slots 100, 102, as shown, to allow single cable guides 78, 82, to be positioned a little more or a little less closer to walls 104, 108.

Hole 94 may be round or square or a slot or a combination or in an alternating pattern, as shown in FIG. 5. Single cable guides 78, 82, and 86 and 90, may have slots 100, 102, to receive bolts 92, 96. Slots 100, 102 enable single cable guides to be moved in the long direction of slots 100, 102, which may, as shown in the example of FIG. 5, be perpendicular to the long dimension of cable tray 80.

Cable tray 80 has a first wall 104 and an opposing second wall 108. Single cable guides 78, 82 may thus be positioned away from first wall 104 and from second wall 108, respectively, using slots 100, 102, so cables held by cable guides 78, 82 may be advantageously positioned within cable tray 80, for example, against cable tray walls or to adjust gap widths.

Figure 6:
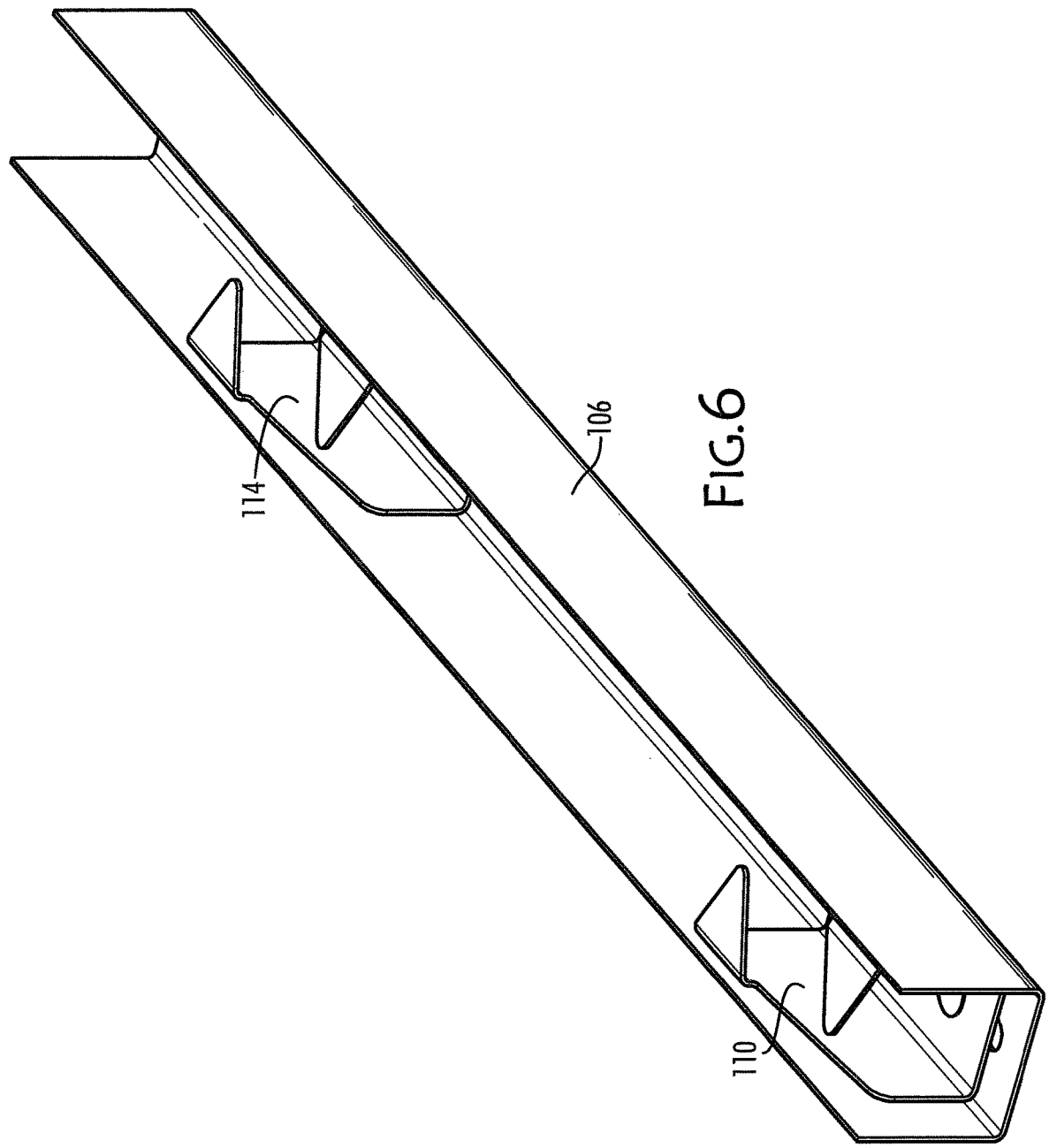
FIG. 6 is a perspective view of a narrow cable tray with two double cable guides, according to an aspect of the disclosure.

Cable trays vary in width; some are relatively narrow and some are wider. FIG. 6, for example, shows a narrow cable tray 106 with two double cable guides, 110, 114, respectively, therein.

Figure 7:
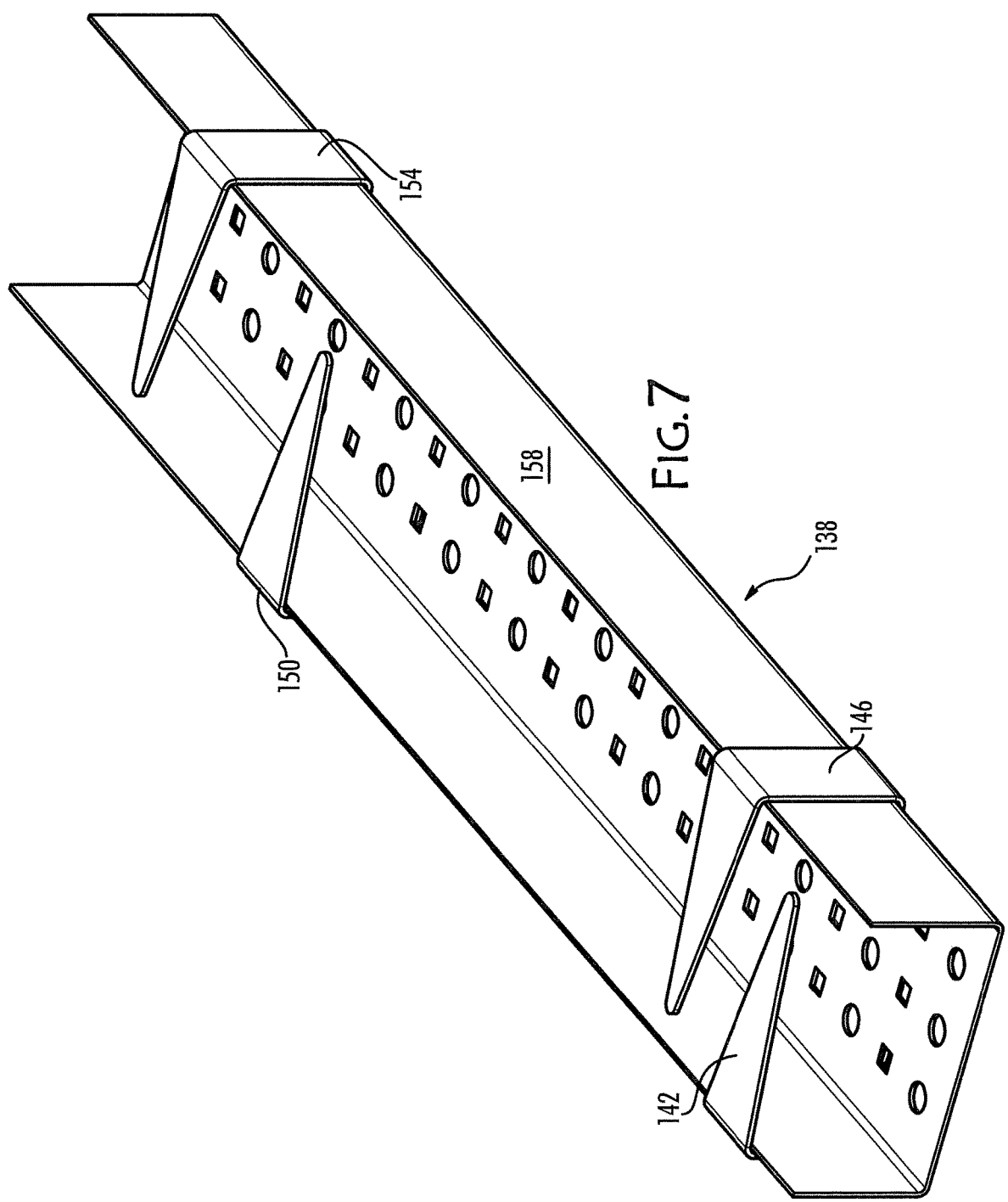
FIG. 7 is a perspective view of a wide cable tray with two single cable guides installed on the outside of the wide cable tray, one pair of single cable guides with closer cable guide spacing and the other with greater cable guide spacing, according to an aspect of the disclosure.
Figure 9:
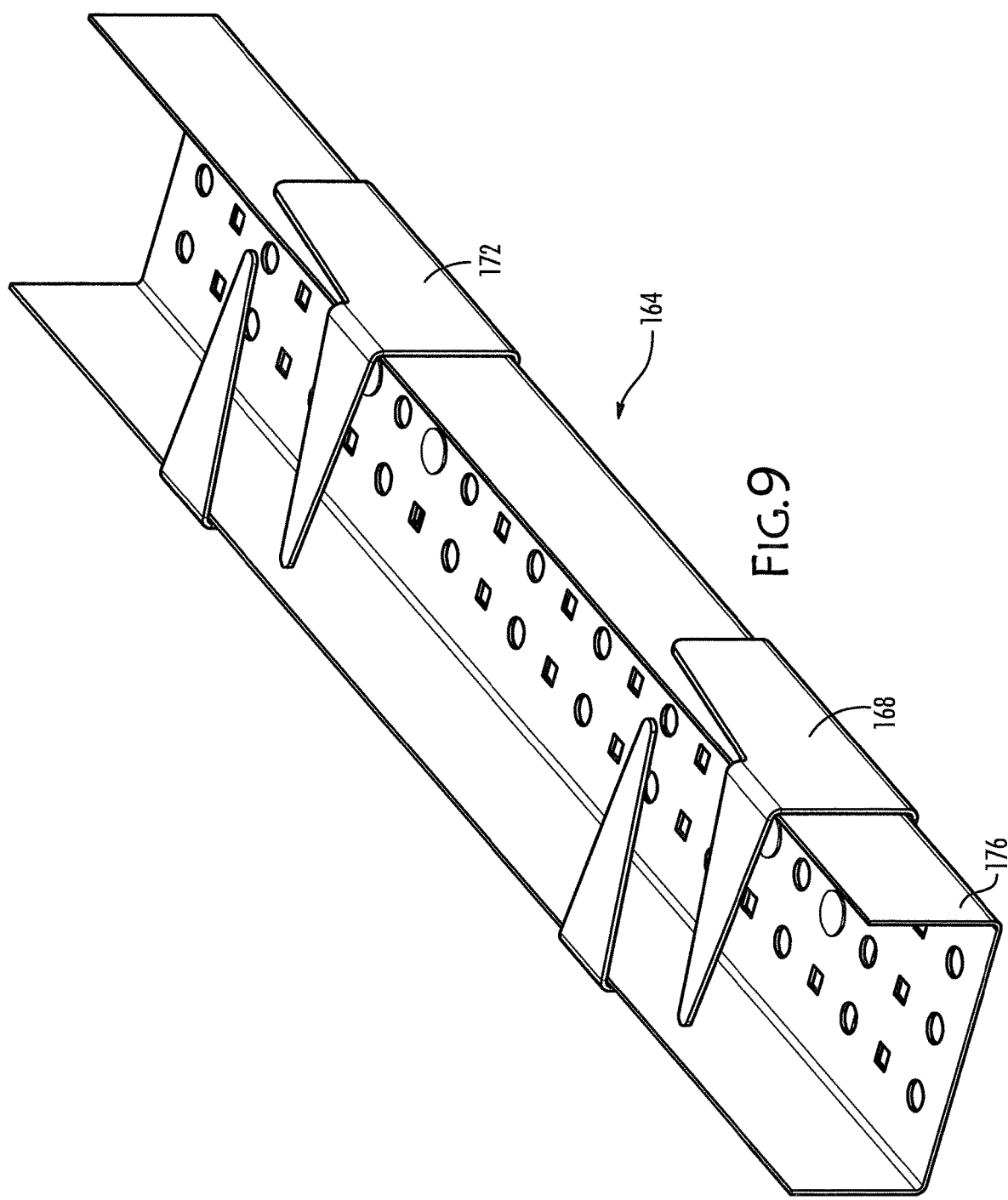
FIG. 9 shows a cable tray with two double cable guide attached to the outside of the cable tray, according to an aspect of the disclosure.

FIG. 7 depicts a wide cable tray 138 with a first pair of single cable guides 142, 146 and a second pair of single cable guides 150, 154, that are attached to the exterior surface 158 of cable tray 138. Whereas pairs of single cable guides are shown inserted into the interior of cable tray 106 in FIG. 6, single cable guides 142, 146, 150, and 154 can be slid over the exterior surface 158 in FIG. 7. An advantage of cable guides 142, 146, 150 and 154 on the exterior surface 158 of cable tray 138 is the increase in capacity of cable tray 138 that results. An advantage of single cable guides 142, 146, 150, 154, over double cable guides 122, 126, as seen in FIG. 9, is that they can be attached directly to exterior surface 158; double cable guides 168, 172, would be placed onto the end of cable tray 164 and slid into position. A disadvantage of exterior cable guides 142, 146, 150, 154, over interior cable guides as shown in FIG. 5, is that a standard cable tray cover cannot be installed after completion of cable loading; custom-made tray covers may be required.

Figure 8:
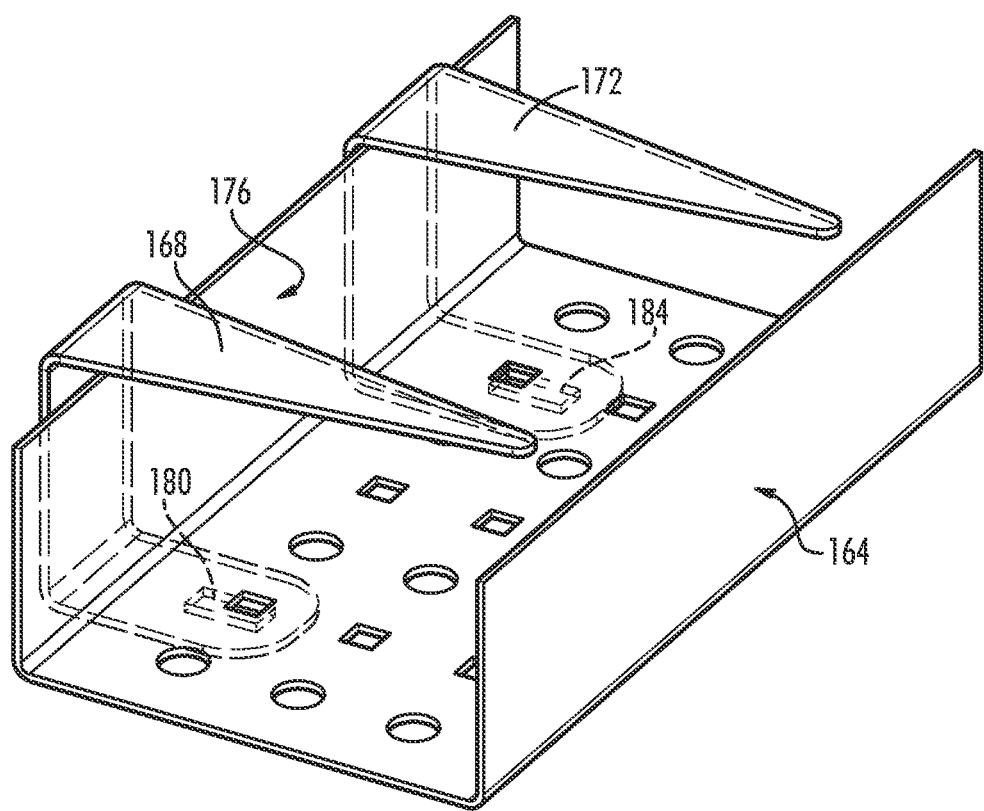
FIG. 8 is a perspective view of a short cable tray with two single cable guides installed on the same side of the exterior of the cable tray, according to an aspect of the disclosure.

FIG. 8 illustrates a portion of a cable tray 164 with two single cable guides 168, 172, attached to the exterior of a first side 176 of cable tray 164. The single cable guides 168, 172 are partially hidden by cable tray 164 and those hidden parts are shown in phantom lines. Cable guides 168, 172, have slots 180, 184 that enable, as seen in FIG. 8, cable guide 168 to be slid away from cable tray 164 and cable guide 172 to be slid toward engagement with cable tray 164.

Figure 10:
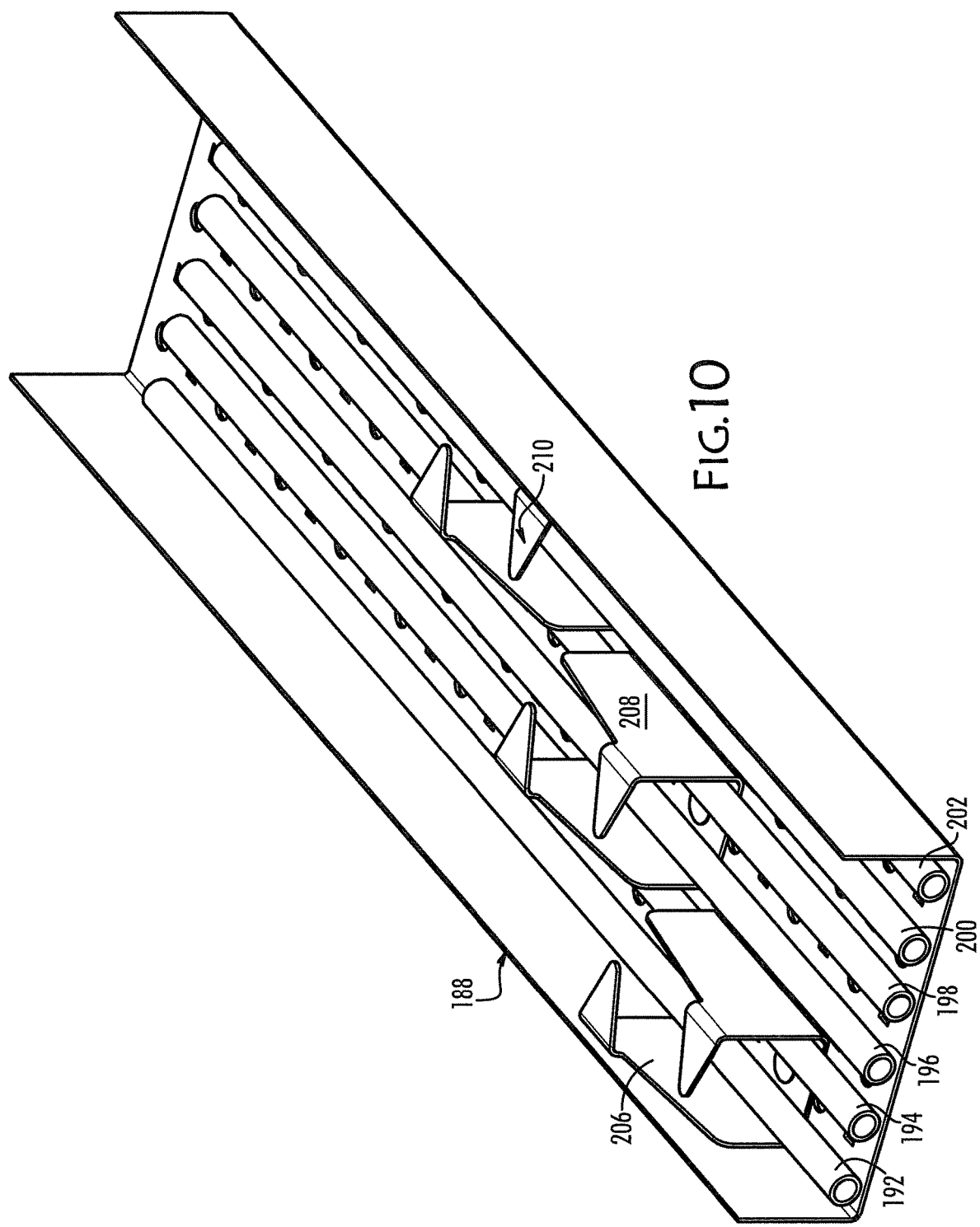
FIG. 10 is a wider cable tray with three double cable guides installed in an axially staggered sequence, including a double cable guide holding two cables, according to an aspect of the disclosure.
Figure 11:
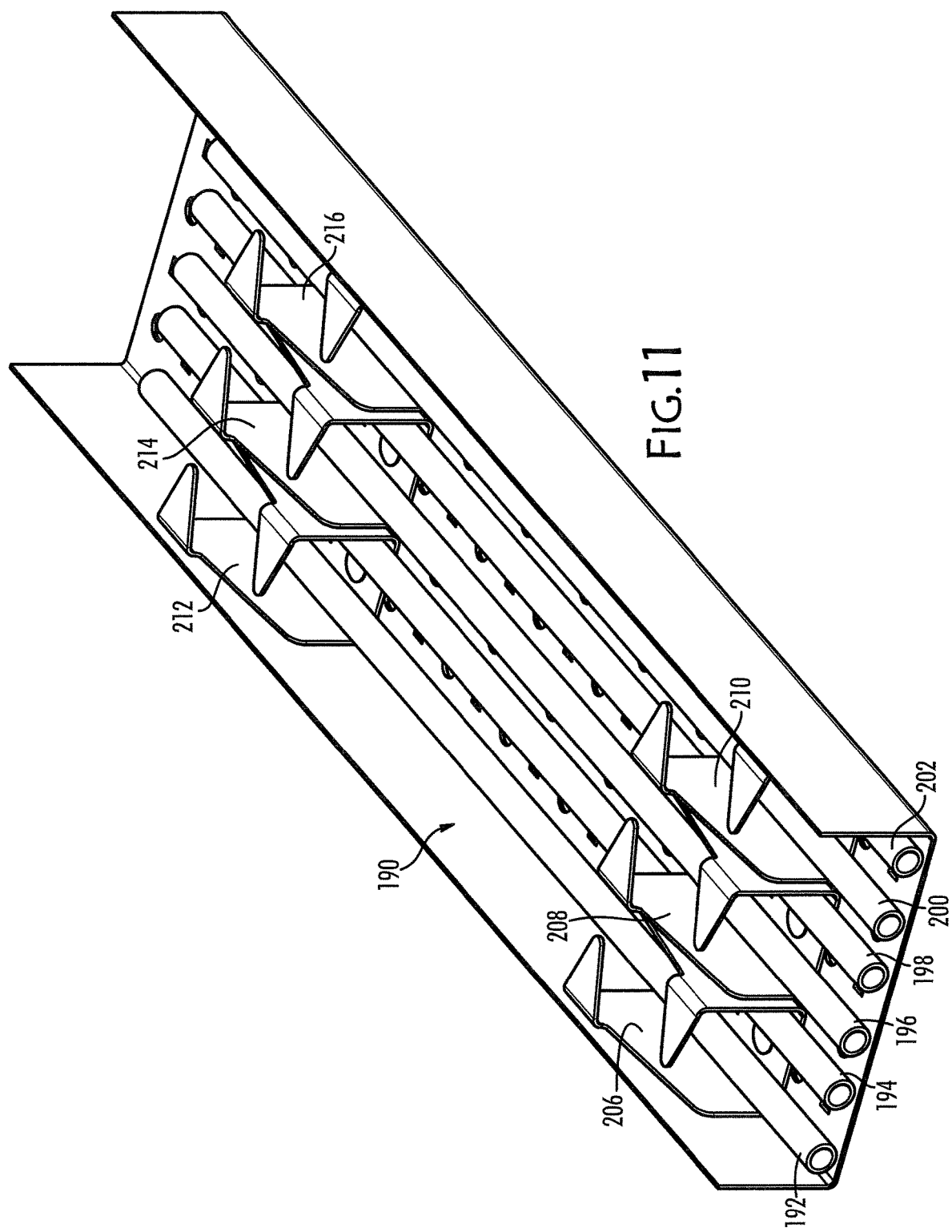
FIG. 11 is a wider cable tray with six double cable guides installed as three sets of two cable guides with a set of the three sets of two double cable guides holding two cables, according to an aspect of the disclosure.

FIGS. 10 and 11 show two examples of a wider cable tray 188 having six cables 192, 194, 196, 198, 200, 202. In FIG. 10, three double cable guides 206, 208, 210 are positioned to be axially and laterally displaced from the other in cable tray 188. Double cable guide 206 holds cables 192 and 194 in cable guide 206; double cable guide 208 holds cables 196 and 198; and double cable guide 210 holds cables 200 and 202.

In FIG. 11, cable tray 190 also has six double cables guides 206, 208, 210, 212, 214, and 216, as seen in FIG. 10. However, three additional double cable guides 212, 214, and 216 have been added to double cable guides 206, 208 and 210. Also double cable guides 206, 208, and 210 are not staggered but aligned, as are the additional double cable guides 212, 214, 216, illustrating a different arrangement for using double cable guides. Cable guide spacings are a matter of discretion for the installer or the manufacturer of cable trays and various factors of the particular installation of cable tray and its cables.

Thus, in FIG. 11, cable guides 206, 208, 210, 212, 214, and 216 may serve an additional function beyond that of holding cables 192, 194, 196, 198, 200, and 202 in cable tray 188 or 190, namely, maintaining the integrity of the cable loading by enabling the user to grouping cables along the length of a cable tray 190. When cables are loaded, they may be loaded in a particular order to integrate cables running to the same location or otherwise related in some functional way. Accordingly, keeping related cables together and preserving the integrity of these cables' relative positions with respect to the other, assures that the related cables reach their common destinations, and also helps the user in tracing cables from origin to destination and accounting for all related cables.

In a similar pattern, shown in FIG. 12, single cable guides can be installed to simulate the cable separation assembly of the double cable guide shown in FIG. 11. by arranging two opposing single cable guides in two groups of three pairs of single cable guides.

Specifically, cable tray 222 is wider, as is cable tray 188, and holds cable 224, cable 226, cable 228, cable 230, cable 232, and cable 234. Twelve single cable guides are divided into six pair of two opposing single cable guides. Each pair of opposing single cable guides acting in the manner of a double cable guide as shown in FIG. 11. Opposing single cable guides 238, 242 and 240, 244 hold cable 224, 226. Opposing single cable guides 246, 250 and 248, 252 hold cables 228, 230. Opposing single cables guides 254, 258 and 256, 260 hold cables 232, 234.

Those familiar with cable tray use and cable maintenance will appreciate the many advantages of the present single and double cable guides from the foregoing description, including such minor modifications and substitutions thereto that do not depart from the spirit and scope of the disclosure.

What is claimed is:

1. A cable guide for use with a cable tray, said cable guide comprising:
   (a) a base having a longitudinal axis;
   (b) a first wall attached to said base, said first wall extending longitudinally in a first direction parallel to said longitudinal axis of said base, said first wall including a first end and a second end, said first end of said first wall being opposite said second end of said first wall in said first direction, said first wall being tapered from said first end of said first wall to said second end of said first wall;
   (c) a second wall attached to said base to define an interior of said cable guide between said first wall, said second wall, and said base, said second wall extending longitudinally in a second direction opposite said first direction, said second wall including a first end and a second end, said first end of said second wall being opposite said second end of said second wall in said second direction, said second wall being tapered from said first end of said second wall to said second end of said second wall;
   (d) a first flange attached to said first wall and extending above said base toward said second wall, leaving a first gap between said first flange and said second wall; and
   (e) a second flange spaced apart from said first flange and attached to said second wall and extending above said base toward said first wall, leaving a second gap between said second flange and said first wall,
   wherein said cable guide has a path between said first flange and said second flange and through said first gap and said second gap, said path being operable for insertion of a cable into said interior of said cable guide,
   wherein said first wall includes a top edge opposite said base, said top edge of said first wall extending substantially linearly downward from said first flange toward said second end of said first wall, and
   wherein said second wall includes a top edge opposite said base, said top edge of said second wall extending substantially linearly downward from said second flange toward said second end of said second wall.

2. The cable guide of claim 1, in combination with a fastener, wherein a hole is formed in said base of said cable guide, and wherein said fastener is dimensioned to fit into said hole in said base to fasten said base of said cable guide to said cable tray.

3. The cable guide of claim 1, wherein each of said first flange and said second flange has a curved end.

4. The cable guide of claim 1, wherein said first flange is tapered toward said second wall.

5. The cable guide of claim 4, wherein said second flange is tapered toward said first wall.

6. The cable guide of claim 1, wherein said first flange and said second flange are flexible.

7. The cable guide of claim 1, wherein said cable guide is dimensioned to fit inside said cable tray.

8. The cable guide of claim 1, wherein said cable guide is dimensioned to fit outside said cable tray.

9. The cable guide of claim 1, wherein said cable guide is made of structural plastic.

10. A cable guide for use with a cable tray, said cable guide comprising:
   (a) a base having a longitudinal axis;
   (b) a first wall extending longitudinally in a first direction parallel to said longitudinal axis of said base, said first wall including a first end and a second end, said first end of said first wall being opposite said second end of said first wall in said first direction, said first wall being tapered from said first end of said first wall to said second end of said first wall;
   (c) a second wall being spaced apart from said first wall to define an interior of said cable guide between said first wall, said second wall, and said base, said second wall extending longitudinally in a second direction opposite said first direction, said second wall including a first end and a second end, said first end of said second wall being opposite said second end of said second wall in said second direction, said second wall being tapered from said first end of said second wall to said second end of said second wall;
   (d) a first flange attached to said first wall adjacent to said first end of said first wall; and
   (e) a second flange attached to said second wall adjacent to said first end of said second wall, said second flange being spaced apart from said first flange,
   wherein said first flange and said second flange define a curved path between said first flange and said second flange, said curved path being dimensioned to allow a cable to be inserted into said interior of said cable guide,
   wherein said first wall includes a top edge opposite said base, said top edge of said first wall extending substantially linearly downward from said first flange toward said second end of said first wall, and
   wherein said second wall includes a top edge opposite said base, said top edge of said second wall extending substantially linearly downward from said second flange toward said second end of said second wall.

11. The cable guide of claim 10, in combination with a fastener, wherein a hole is formed in said base of said cable guide, and wherein said fastener is dimensioned to fit into said hole in said base to fasten said base of said cable guide to said cable tray.

12. The cable guide of claim 10, wherein each of said first flange and said second flange has a curved end.

13. The cable guide of claim 10, wherein said first flange is tapered toward said second wall.

14. The cable guide of claim 13, wherein said second flange is tapered toward said first wall.

15. The cable guide of claim 10, wherein said first flange and said second flange are flexible.

16. The cable guide of claim 10, wherein said cable guide is dimensioned to fit inside said cable tray.

17. The cable guide of claim 10, wherein said cable guide is dimensioned to fit outside said cable tray.

18. The cable guide of claim 10, wherein said cable guide is made of structural plastic.

19. The cable guide of claim 10, wherein said cable guide is operable to be adjustably fastened to said cable tray.

20. The cable guide of claim 10, wherein said first flange and said second flange interleave.

\* \* \* \* \*